(12) United States Patent
Zhou et al.

(10) Patent No.: US 6,751,006 B2
(45) Date of Patent: Jun. 15, 2004

(54) PROCESSING TECHNIQUES FOR SUPERIMPOSING IMAGES FOR IMAGE PROJECTION

(75) Inventors: Samuel Z. Zhou, North York (CA); Sean Adkins, Vancouver (CA)

(73) Assignee: Imax Corporation (CA)

( * ) Notice: Subject to any disclaimer, the term of this patent is extended or adjusted under 35 U.S.C. 154(b) by 0 days.

(21) Appl. No.: 10/312,032

(22) PCT Filed: Jul. 3, 2001

(86) PCT No.: PCT/US01/21172

§ 371 (c)(1), (2), (4) Date: Dec. 19, 2002

(87) PCT Pub. No.: WO02/03688

PCT Pub. Date: Jan. 10, 2002

(65) Prior Publication Data

US 2004/0032419 A1 Feb. 19, 2004

Related U.S. Application Data

(60) Provisional application No. 60/215,707, filed on Jul. 3, 2000.

(51) Int. Cl.$^7$ ............ G02B 26/00; H04N 5/74; G02F 1/00; G03F 3/08; G09G 3/00
(52) U.S. Cl. ............ 359/291; 359/224; 348/750; 348/755; 348/758; 348/771; 355/32; 382/298; 345/32; 345/764
(58) Field of Search ............ 359/291, 224, 359/290; 348/219, 220, 265, 203, 750, 755, 758, 771; 345/32, 764; 355/32, 41; 358/518, 1.9; 382/298, 275

(56) References Cited

U.S. PATENT DOCUMENTS 4,843,381 A 6/1989 Baron

| | | |
|---|---|---|
| 5,086,341 A | 2/1992 | Tamada et al. |
| 5,386,253 A | 1/1995 | Fielding |
| 5,490,009 A | 2/1996 | Venkateswar et al. |
| 5,612,753 A | 3/1997 | Poradish et al. |
| 5,668,611 A | 9/1997 | Ernstoff et al. |
| 5,796,442 A | 8/1998 | Gove et al. |
| 5,809,182 A | 9/1998 | Ward et al. |
| 5,844,663 A | 12/1998 | Holley et al. |
| 5,990,982 A | 11/1999 | Gove et al. |

FOREIGN PATENT DOCUMENTS

| EP | 0 606 162 | 7/1994 |
|---|---|---|
| EP | 0 751 683 | 1/1997 |

OTHER PUBLICATIONS

Patent Abstracts of Japan, vol. 1995, No. 08, Sep. 29, 1995 & JP 07 134275 A (Mitsubishi Electric Corp), May 23, 1995 abstract.

Patent Abstracts of Japan, vol. 013, No. 587 (P–983) Dec. 25, 1989 & JP 01 251081 A (Toshiba Corp) Oct. 6, 1989.

Takahashi et al., "A Highly Realistic Video Display Based on the Interleave Projection Method," *NTT Review*, 5(6):66–68 (Nov. 1993).

*Primary Examiner*—Loha Ben
(74) *Attorney, Agent, or Firm*—Dean W. Russell; Michael J. Turton; Kilpatrick Stockton LLP

(57) ABSTRACT

Addressed herein are techniques and equipment for pre-processing digital images to be superimposed for display. Filtering, re-sampling, and decimation are variously used to process images and sub-images to produce to-be-superimposed images. One of the described techniques is designed primarily (although not necessarily exclusively) for computational efficiency, while the other sacrifices some computational efficiency for higher quality of output images.

20 Claims, 2 Drawing Sheets

PROCESSING TECHNIQUES FOR SUPERIMPOSING IMAGES FOR IMAGE PROJECTION

CROSS-REFERENCE TO RELATED APPLICATIONS

This application claims priority to U.S. Provisional Application Ser. No. 60/215,707 filed on Jul. 3, 2000 and International Application No. PCT/US01/21172 filed on Jul. 3, 2001 and published in English as International Publication No. WO 02/03688 A2 on Jan. 10, 2002, the entire contents of which are incorporated herein by this reference.

FIELD OF THE INVENTION

This invention relates primarily to electronic projection of images and more particularly to techniques and equipment for processing sub-images prior to their projection onto a screen or other surface for the purpose of superimposing one or more sub-images onto one or more other sub-images.

BACKGROUND OF THE INVENTION

U.S. Pat. No. 5,490,009 to Venkateswar, et al., incorporated herein in its entirety by this reference, discusses a display system in which two sub-images generated using spatial light modulators (SLMs) are partially superposed (with a spatial offset) and displayed simultaneously. As described in the Venkateswar patent, the system purportedly provides enhanced resolution of a projected image by merely increasing the number of SLMs. Either horizontal or vertical resolution, or both, can be enhanced. For example, to approximate a twofold increase in horizontal resolution, the system uses two SLMs, each having x pixels per row and y rows. Each of the two SLMs provides a "sub-image," generated from alternating samples of data, with the sampling rate providing 2(x) samples per row. The two images are partially superposed, with a horizontal offset of ½ the center-to-center horizontal spacing of the pixels of the SLM. The resulting image has a perceived quality approaching that of a system that generates a single image from a SLM having 2(x) pixels per row.
See Venkateswar, col. 2, ll. 32–43.

FIG. 1 of this application illustrates exemplary spatial superimposition of two imagers; one offset one-half pixel diagonally from the other. Stated differently, the display of FIG. 1 may be made by offsetting the pixels of Imager A (as compared to those of Imager B) by one-half their size in both the horizontal and vertical dimensions. To permit this type of superimposition, a base image "I" must be processed so as to divide it into two diagonally-offset components, sub-images "$I_A$" (associated with Imager A) and "$I_B$" (associated with Imager B).

Shown in FIG. 2 of the Venkateswar patent is a block diagram of a system for displaying superimposed sub-images. Although the illustrated system includes a block designated "processor system" (element 23 of the drawing), the sole recitation of its function is as follows:

Processor system 23 prepares the data for display by performing various pixel data processing tasks. Processor system 23 includes whatever processing memory is useful for such tasks, such as field and line buffers. The tasks performed by processor system 23 may include linearization (to compensate for gamma correction), colorspace conversion, and line generation.

See id. col. 4, ll. 36–42. Thus, absent from the Venkateswar patent is any disclosure of specific techniques for processing base images to obtain any resolution-enhancing benefits of superimposition.

SUMMARY OF THE INVENTION

The present invention addresses such techniques for pre-processing of images to be superimposed for display. In general, the techniques, which utilize signal-processing algorithms, create from a higher resolution image a selected number of components, which components subsequently will be combined through superimposition of multiple imagers. The ultimate result of using these techniques is projection of images with higher resolution than that obtainable through use of each single imager.

Superimposition may be achieved within a projector by combining multiple imagers before the composite image is passed to the projection lens. Alternatively, superimposition may occur by overlaying multiple precisely-aligned projectors. Those skilled in the art will understand that techniques of the present invention are useful in either situation, however, and may be applicable in many cases without regard to the types of SLMs and light valves, sources, or engines employed. In particular, any SLMs utilized in the projection system may—but need not be—the deformable mirror devices (DMDs) referenced in the Venkateswar patent.

Generally speaking, any display based on imagers with a discrete pixel array where the number of pixels for the horizontal and vertical dimensions of the image are fixed has a certain maximum spatial frequency that it can display. It is convenient to convert the spatial frequency of the display from pixels per unit area to a more common imaging dimension such as lines per millimeter which can be done by assuming a reference image size and dividing the number of pixels by that size in millimeters. When such displays are used to show images that are derived from photographic film, for example, such a relationship is particularly useful as it helps to describe how well a photographic image with a certain modulation transfer function (MTF) will be reproduced by the display. MTF is commonly expressed as a graph showing depth of modulation in percent versus lines per millimeter.

For a given reference image size, doubling the number of pixels of the imager will double the maximum spatial frequency that the display can represent. Unfortunately, such a doubling in each direction increases the number of pixels by four (2×2) times, and the difficulty of fabrication of pixel array imagers such as DMDs is greatly increased by such large increases in pixel count.

It is also essential that for a given pixel count, the spatial frequency content of image data to be displayed must be limited so that the spatial frequency capability of the display is not exceeded. If this is not done higher frequencies will be incorrectly displayed as lower ones; a phenomenon commonly called aliasing.

By using the technique of superimposition one can simulate the effect of doubling the number of imager pixels. This requires that a starting image have at least the spatial frequency content from sampling that is two times the spatial frequency limit of either of the two rasters that will be superimposed. This increased spatial frequency content can then be subdivided between the two rasters using suitable re-sampling techniques.

Because the resulting display is composed of superimposed pixels of twice the size (offset by ½ pixel diagonally), there is a summation that takes place at the projection screen. This summation reduces the MTF available above the spatial frequency limit of a single imager, so that the MTF of a display with two superimposed imagers is not exactly equal to that of a single imager with twice as many pixels, but the improvement is still significant. The summation has the additional benefit that the visibility of subraster pitch artifacts in the display (such as the gaps between the mirrors of a DMD device) is reduced by the summation of two offset rasters. Additionally, it is necessary to take into account the fact that pixels are adding together at the display by compensating for the increased black level and the effective stretching of the dynamic range that will occur.

DETAILED DESCRIPTION

Figure 2:
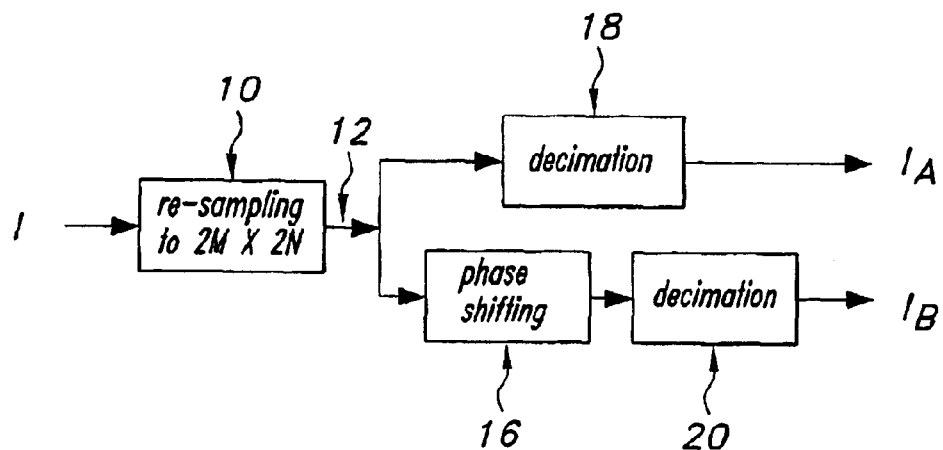
FIG. 2 is a diagrammatic representation of a method for splitting a base image into sub-images using re-sampling and decimation.

Illustrated in FIG. 2 is a first method for re-sampling a base image I into components $I_A$ and $I_B$. Designed for computational efficiency, the method illustrated in FIG. 2 maximizes use of integer data throughout the processing. Although multipliers and divisors of two are preferable, multipliers and divisors of other (preferably integer) values may be utilized instead.

In connection with FIG. 2, assume, for example, that base image I has resolution of X×Y pixels, and each of the two imagers in the display has a resolution of M×N pixels. Base image I may then be re-sampled 10, consistent with this method, to an intermediate resolution of 2M×2N pixels (where X typically is greater than, but at least is equal to, 2M, and Y typically is greater than, but at least is equal to, 2N). Any appropriate digital low-pass filter may be employed to effect such re-sampling; in at least some embodiments of the invention, however, either a sinc filter (i.e. an ideal low-pass filter) or a lanczos filter (i.e. a time-windowed version of the sinc filter) is desirably used. Sinc and lanczos filters in particular provide good performance when the SLMs are DMDs, although those skilled in the art will recognize that other digital filters conceivably could be used instead. Generally, however, such filters will be chosen consistent with the goal of tailoring the frequency of the image data to the display.

Figure 1:
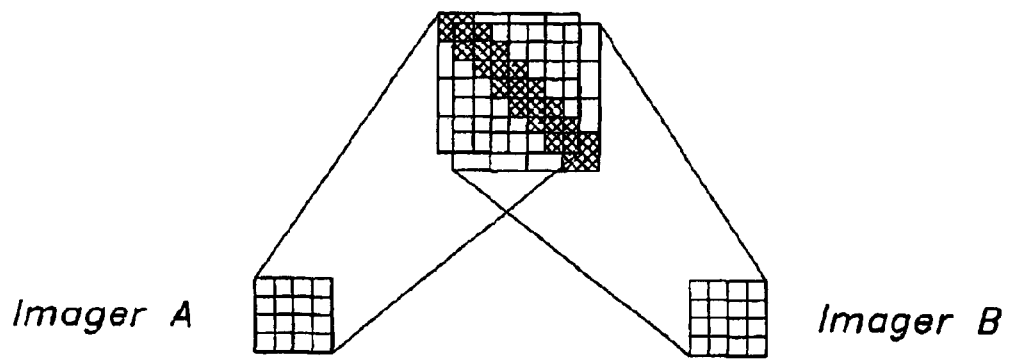
FIG. 1 is, as noted above, a schematicized illustration of an exemplary spatial superimposition of two imagers, one offset diagonally from the other.

Thereafter, the re-sampled image is processed to create two sub-images $I_A$ and $I_B$. One of the components $I_A$ has no phase shift but is simply the re-sampled base image 12 subjected to decimation 18, while the other component $I_B$ is the re-sampled base image 12 shifted by one pixel diagonally 16 (consistent with FIG. 1) and then subjected to decimation 20. Again, however, the invention is not necessarily limited to techniques in which a one pixel diagonal phase shift occurs, but rather is more broadly applicable.

Decimation 18, 20, comprises filtering and sub-sampling of the input base image pixels at selected periodicity, to produce respective sub-images $I_A$ and $I_B$ of resolution M×N (the imager resolution). Preferably (although, as noted above, not necessarily), the decimation ratio is fixed at two. With the decimation ratio so fixed, the decimation process can be implemented efficiently using, for example, a digital impulse or box filter.

The method illustrated in FIG. 2 can be performed relatively quickly, since division of base image I occurs at a resolution of 2M×2N, which may be a re-sampled version of the original resolution. However, because filtering occurs in two parts of the process, during both the initial re-sampling and the later decimation steps, the resulting image quality is somewhat difficult to control.

Figure 3:
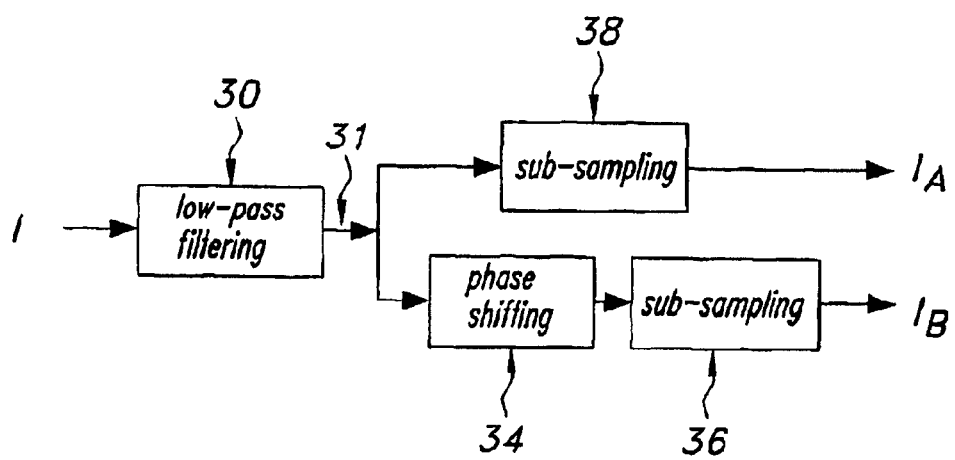
FIG. 3 is a diagrammatic representation of a method for splitting a base image into sub-images using filtering and sub-sampling.

The method illustrated in FIG. 3, by contrast, is designed to achieve high image quality. As a consequence, its throughput is likely to be less than that of the method illustrated in FIG. 2, which as noted above is designed for computational efficiency. As shown in FIG. 3, base image I is passed through a low-pass filter before further processing occurs. Although the cut-off frequency of the filter typically is determined by the ratio of the original image resolution to that required in the subsequent sub-sampling operation, many other characteristics of the filter may be chosen in order to provide good balance between reducing aliasing and preserving image details. These characteristics can, therefore, be identified by those skilled in the art using appropriate engineering judgment.

Again, assume that we have a base image I of resolution X×Y (where X and Y are at least twice the corresponding resolutions of the each imager) and imagers of resolution M×N. Here the ratio between the base image resolution and the effective display resolution is used to determine the filtering required, taking into account the ability of the superimposed display to support higher image spatial frequency content than a single imager can display without aliasing. After the base image I is filtered 30 into a filtered base image 31, which is a lower resolution version of the base image, the two sub images are created. Sub image $I_A$ is simply the filtered base image 31 sub-sampled 38 to the imager resolution M×N. Sub image $I_B$ is created by applying the appropriate diagonal phase shift 34 (also determined by the ratio of the original image resolution and the effective display resolution of the two superimposed imagers) to the filtered base image 31 and then sub-sampling 36 to the imager resolution M×N. Again, however, the effective phase shift of sub-image $I_B$ need not necessarily be exactly one-half pixel diagonally and, if desired for some reason, sub-image $I_A$ can have a non-zero phase shift too. Because this method typically contemplates conducting all processing operations at the original resolution of base image I, it likely will require more computing time than will the method illustrated in FIG. 2.

The action of filter 30 may be further improved by making the cut-off frequency a function of pixel value. Decreasing the cut-off frequency for bright areas of the image for example is effective in reducing the visibility of raster artifacts that may result from displays such as those based on DMD devices where pixels are very sharply defined due to the construction of the DMD device.

Nothing in this application is intended to limit use of the disclosed processing techniques to systems having only two imagers. Indeed, superimposition can be realized through multiple imagers. As but one example, four imagers can be utilized by adding horizontal and vertical half-pixel phase-shift components to the zero and diagonal phase-shift components. Experiments to date demonstrate that such a four-imager system can further improve resolution of displayed images over that of the two-imager system illustrated in FIG. 1.

Similarly, nothing in this application requires only mutually-exclusive use of methods illustrated in FIGS. 2 and 3 for a particular system. Instead, such methods may be used alternately in the same system, with the method of FIG. 3 being employed when highest-quality images are required and the method of FIG. 2 being used otherwise, for example. Thus, although the foregoing is provided for purposes of illustrating, explaining, and describing embodiments of the present invention, further modifications and adaptations to these embodiments will be apparent to those skilled in the art and may be made without departing from the scope or spirit of the invention.

Figure 4:
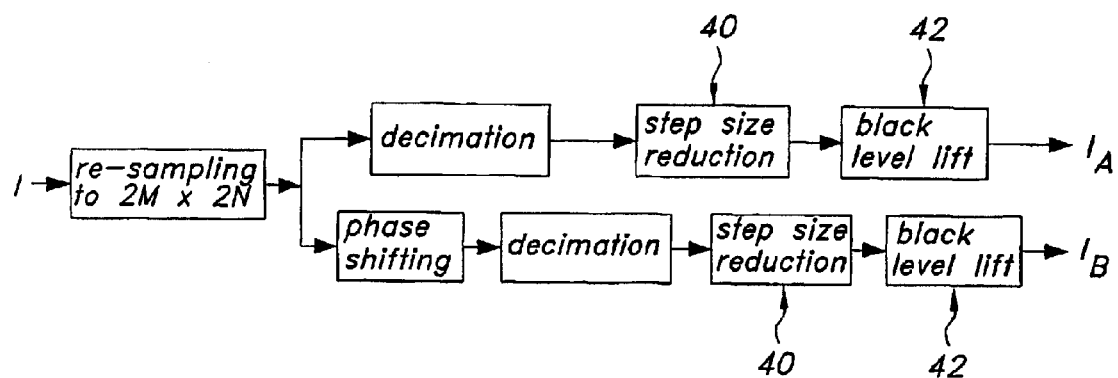
FIG. 4 is a diagrammatic representation of the method of FIG. 2 augmented to include additional processing steps.
Figure 5:
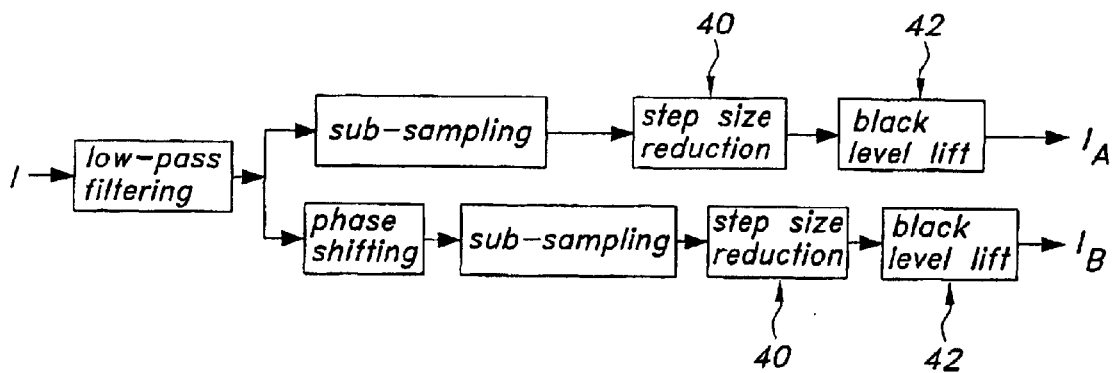
FIG. 5 is a diagrammatic representation of the method of FIG. 3 augmented to include additional processing steps.

As an example of possible modifications to these embodiments, FIGS. 4 and 5 illustrate the methods of FIGS. 2 and 3 as augmented to include additional processing steps. Superimposition of two image components effectively sums up the illumination from two imagers at each pixel position. Assuming two imagers are equally bright, then the effect of superimposition doubles the brightness of the display image. However, it also doubles the black level of the display image, resulting in reduction in perceived image contrast. Furthermore, the increase in image brightness also increases the step size between neighboring pixel values, which may lead to visible contouring artifacts.

The problem of contouring artifacts can be compensated by reducing the pixel value step size 40 of each image component (see FIGS. 4 and 5). This can be achieved by dividing the pixel values of each component by two before superimposition. However, there are two problems with this simple division approach. First, if the black level of each imager is higher than 50% of the brightness of the least significant bit, division by two will introduce black level clipping. Second, the division operation introduces a quantization error unless sufficient pixel depth is provided.

The solution to black level clipping is to pre-process each image component to ensure that the brightness of the least significant bit is at least twice as high as the imager black level. This processing is called "black level lift" 42 (again see FIGS. 4 and 5), and it can be realized by scaling pixel values at sufficient precision. To avoid quantization error from division, the bit depth of each image component is ideally increased by one bit. Both processing steps can be done in the pre-processing stage prior to re-sampling to the final imager resolution. It is also possible to achieve this processing in the projector using a look-up table or other method.

The foregoing is provided for purposes of explanation and disclosure of preferred embodiments of the present invention. Further modifications and adaptations to the described embodiments will be apparent to those skilled in the art and may be made without departing from the scope or spirit of the invention and the following claims.

What is claimed is:

1. A method for processing a base image having a resolution of X times Y pixels, the method comprising:
   re-sampling the base image to a resolution of 2M times 2N pixels, wherein X is equal to at least 2M and Y is equal to at least 2N;
   producing a first sub-image by decimation of the re-sampled base image to a resolution of M times N pixels; and
   producing a second sub-image by shifting the phase of the re-sampled base image and then decimation of the phase shifted image to a resolution of M times N pixels.

2. The method of claim 1 wherein the decimation to produce the sub-images comprises filtering and sub-sampling of the re-sampled base image.

3. The method of claim 2 wherein the decimation to produce the two sub-images is implemented with a box filter.

4. The method of claim 2 wherein the decimation to produce the two sub-images is implemented with a box filter.

5. The method of claim 1 wherein the decimation to produce the two sub-images has a decimation ratio of two.

6. The method of claim 1 wherein the second sub-image is produced by phase shifting the re-sampled base image by a one pixel diagonal phase shift.

7. The method of claim 1 wherein the re-sampling of the base image is achieved using a digital low-pass filter.

8. The method of claim 7 wherein the digital low-pass filter is a sinc filter.

9. The method of claim 7 wherein the digital low-pass filter is a lanczos filter.

10. The method of claim 1, further comprising:
    reducing the pixel value step size of the first sub-image and the second sub-image.

11. The method of claim 10, wherein the pixel value step size is reduced by dividing the pixel values of the first sub-image and the second sub-image by two.

12. The method of claim 10, further comprising:
    performing a black level lift on the first sub-image and the second sub-image.

13. The method of claim 12, wherein the black level lift is performed by scaling the pixel values at sufficient precision of the first sub-image and the second sub-image.

14. A method for processing a base image having a resolution of X times Y pixels, the method comprising:
    passing the base image through a low pass filter;
    producing a first sub-image by sub-sampling the filtered base image to a resolution of M times N pixels; and
    producing a second sub-image by shifting the phase of the filtered base image and then sub-sampling the phase shifted image to a resolution of M times N pixels,
    wherein X is equal to at least 2M and Y is equal to at least 2N.

15. The method of claim 14 wherein the cut-off frequency of the low pass filter is a function of pixel value.

16. The method of claim 14 wherein the second sub-image is produced by a one-half pixel diagonal phase shift of the filtered base image.

17. The method of claim 14, further comprising:
    reducing the pixel value step size of the first sub-image and the second sub-image.

18. The method of claim 17, wherein the pixel value step size is reduced by dividing the pixel values of the first sub-image and the second sub-image by two.

19. The method of claim 17, further comprising:
    performing a black level lift on the first sub-image and the second sub-image.

20. The method of claim 19, wherein the black level lift is performed by scaling the pixel values at sufficient precision of the first sub-image and the second sub-image.

* * * * *